United States Patent [19]
Buck et al.

[11] Patent Number: 6,078,866
[45] Date of Patent: Jun. 20, 2000

[54] INTERNET SITE SEARCHING AND LISTING SERVICE BASED ON MONETARY RANKING OF SITE LISTINGS

[75] Inventors: Bryan J. Buck; Michael Melcher, both of Honolulu, Hi.

[73] Assignee: SearchUP, Inc., Honolulu, Hi.

[21] Appl. No.: 09/153,151

[22] Filed: Sep. 14, 1998

Related U.S. Application Data

[60] Provisional application No. 60/090,477, Jun. 24, 1998.

[51] Int. Cl.[7] .................................................. G06F 17/30
[52] U.S. Cl. ............................................. 702/2; 707/102
[58] Field of Search ............................. 709/202; 707/10, 707/104, 4, 9, 2, 102

[56] References Cited

U.S. PATENT DOCUMENTS

| | | |
|---|---|---|
| 5,659,732 | 8/1997 | Kirsch . |
| 5,748,954 | 5/1998 | Mauldin . |
| 5,903,882 | 5/1999 | Asay et al. ................. 705/44 |

OTHER PUBLICATIONS

Article, Mar. 3, 1998, from "The Search Engine Report" http://www.searchenginewatch.com/sereport/9803–go-to–html, "Go to Sell Positions".

Article, Jun. 21, 1996, from CNET News, http://www.nees.com/News?Item/0,4,1635,00.html, "Engine Sells Results, Draws Fire".

Press Release on Lightweight Directory Access Protocol (LDAP), Netscape Comm. Corp., Mountain View, CA, Apr. 1996.

ClickMail Central Directory, circa Apr. 1996, at www.oneclick.com/server/.

GoTo.com, circa 19998, at ww.goto.com.

Northern Light, circa 1997–98, at sirocco.northern light.com.

*Primary Examiner*—Wayne Amsbury
*Attorney, Agent, or Firm*—Leighton K. Chong

[57] ABSTRACT

A system of network site searching and listing employs a server which maintains a listings database containing site listings, provided by subscribers, each of which includes a title or description of the content of the respective site, a network address at which the site can be accessed, and a denominated value to be paid by the subscriber as a subscription fee for the site listing. In response to search queries, the server provides a search report of listings ranked according to the subscription fees paid by the subscribers. The higher the amount paid for a given subscription period in relation to other listers, the higher the site's ranking on the service's search reports. Through an account monitoring interface, subscribers can monitor the ranking of their listings and modify their account information and subscription fees automatically at any time. The denominated-values approach to rankings may be used in conjunction with the index search method or the category search method. The denominated-values database may also be linked to other search services, and the denominated-values rankings of the listings can be converted into the relevancy measures used by the other search services. The service provides immediate placement control for subscribers, without high transaction costs or delays, based on a ranking system determined by monetary value rather than arbitrary relevancy factors.

23 Claims, 7 Drawing Sheets

○41 URL POSITION MANAGER ™
CHANGE PASSWORD OR PERSONAL INFORMATION

| ○42 RANK | ○43 FEE | ○44 URL | ○45 CATEGORY | ○46 EXPIRES | ○47 | ○48 |
|---|---|---|---|---|---|---|
| 5 | $160 | http://www.example1.com | ART - MUSEUM/GALLERY | 7/15/98 | UPDATE | REMOVE |
| 3 | $110 | http://www.example2.com | ART - ART I - MIXED MEDIA | 7/15/98 | UPDATE | REMOVE |
| 8 | $80 | http://www.example3.com | ART - ART II - PHOTOGRAPHY | 12/13/98 | UPDATE | REMOVE |
| 32 | $40 | http://www.example4.com | ART - ART II - WATERCOLOR | 4/4/99 | UPDATE | REMOVE |

○49 ADD NEW URL TO - ART - MUSEUM / GALLERY - COMMERCIAL

SEARCH: ⓵ₐ

| ②ₐ | ③ₐ | ④ₐ | ⑤ₐ |
|---|---|---|---|
| $100 | URL Title #1 | URL Description #1 | URL #1 Category - Main Category - Title - Sub-Category |
| $90 | URL Title #2 | URL Description #2 | URL #2 Category - Main Category - Title - Sub-Category |
| $90 | URL Title #3 | URL Description #3 | URL #3 Category - Main Category - Title - Sub-Category |
| $90 | URL Title #4 | URL Description #4 | URL #4 Category - Main Category - Title - Sub-Category |
| $80 | URL Title #5 | URL Description #5 | URL #5 Category - Main Category - Title - Sub-Category |
| $80 | URL Title #6 | URL Description #6 | URL #6 Category - Main Category - Title - Sub-Category |
| $80 | URL Title #7 | URL Description #7 | URL #7 Category - Main Category - Title - Sub-Category |
| $80 | URL Title #8 | URL Description #8 | URL #8 Category - Main Category - Title - Sub-Category |
| $70 | URL Title #9 | URL Description #9 | URL #9 Category - Main Category - Title - Sub-Category |
| $60 | URL Title #10 | URL Description #10 | URL #10 Category - Main Category - Title - Sub-Category |
| $60 | | | |

FIG. 4A (11a) CATEGORY: ART - MUSEUM/GALLERY - COMMERCIAL

| (12a) | (13a) | (13b) | (13c) | (13d) | (13e) | (13f) |
|---|---|---|---|---|---|---|
| Animation | Cartonists | Comic Book | Computer | Other | | |
| Architecture | Exhibits | Firms | Landscape | Other | | |
| Art I | Acrylic | Drawing | Fashion | Furniture | Masters | Mixed-Media |
| Art II | Oils | Photography | Sculptures | Watercolor | Other | |
| Computer Art | 3D Art | Companies | Other | | | |
| Graphic Design | Commercial | Other | | | | |
| Museum/Gallery | Commercial | Events | Exhibits | History | University | Other |
| Performing | Actor/Actress | Companies | Dancers | Magicians | Musicians | Other |

| (14a) | (15a) | (16a) |
|---|---|---|
| $100 | URL Title #1 | URL Description #1 |
| $90 | URL Title #2 | URL Description #2 |
| $90 | URL Title #3 | URL Description #3 |
| $90 | URL Title #4 | URL Description #4 |
| $80 | URL Title #5 | URL Description #5 |
| $80 | URL Title #6 | URL Description #6 |
| $80 | URL Title #7 | URL Description #7 |
| $80 | URL Title #8 | URL Description #8 |
| $70 | URL Title #9 | URL Description #9 |
| $60 | URL Title #10 | URL Description #10 |
| $60 | URL Title #11 | URL Description #11 |
| $50 | URL Title #12 | URL Description #12 |
| $50 | URL Title #13 | URL Description #13 |
| $50 | URL Title #14 | URL Description #14 |
| $40 | URL Title #15 | URL Description #15 |
| $30 | URL Title #16 | URL Description #16 |
| $30 | URL Title #17 | URL Description #17 |
| $30 | URL Title #18 | URL Description #18 |
| $20 | URL Title #19 | URL Description #19 |
| $20 | URL Title #20 | URL Description #20 |
| $10 | URL Title #21 | URL Description #21 |
| $10 | URL Title #22 | URL Description #22 |
| $10 | URL Title #23 | URL Description #23 |
| $10 | URL Title #24 | URL Description #24 |
| $0 | URL Title #25 | URL Description #25 |
| $0 | URL Title #26 | URL Description #26 |
| $0 | URL Title #27 | URL Description #27 |

INTERNET SITE SEARCHING AND LISTING SERVICE BASED ON MONETARY RANKING OF SITE LISTINGS

This patent application claims the benefit of the filing date of U.S. Provisional Application Ser. No. 60/090,477 filed on Jun. 24, 1998.

TECHNICAL FIELD

This invention relates to an Internet site searching and listing system, and in particular, to a system which is based on ranking of site listings based on monetary value.

BACKGROUND ART

The Internet is a vast, global network of countless computers, networks, routers and data lines. It was created for the U.S. Department of Defense (DoD) in the 1970's. The Department of Defense needed to establish a research network to link computers in universities, research labs and government centers across the country. The DoD network was opened to the public in the 1980's when the National Science Foundation (NSF) established its own network, the NSFNET, based on the existing network structure. Administration of the backbone structure for the Internet and domain name registrations was eventually transferred to private companies, as the Internet was opened to commercial usage in the 1990's.

Since 1995, the growth of the Internet has been phenomenal. The Internet connects users with the plethora of sites on the network having information content principally by a system of site addressing using Universal Resource Locators (URLs), known as the World Wide Web (WWW). As the number of sites have grown exponentially, search services have arisen as the key entry points to the Internet for the millions of users searching for content among hundreds of millions of sites on the Web. The number of search services has expanded from a handful in 1995 to over 500 in 1998.

Search services distinguish themselves by the extent of sites that they have indexed and by the efficiency with which they can find and list relevant sites for a user in response to a search query. There are two general types of search methodologies that have evolved: the index or Boolean search, and the category or directory search.

The index or Boolean search allows the user to enter one or more keywords, which may be qualified by Boolean operators, in order to locate relevant content by matching the keywords with those appearing in the content. Because the total data volume of content is prohibitively large, search services will maintain listings of summaries of content provided by the content providers themselves and/or will generate abstracts of content using automated "spiders" or "robots" which systematically search through the Internet for content. The latter type of utility program is designed to jump from one Internet site address to another collecting information on the data it encounters.

An advantage of the index or Boolean search is the ability to find relevant content using a Boolean syntax to help narrow the search. This type of search is beneficial when locating content that can be pinpointed by keywords. The downside of this method is the potential number of items that may be found if the search parameters are not sufficiently narrowed. To reduce confusion from overly large search finds, some index search services have developed methods for ranking the search "hits" based upon various types of relevancy indicators.

No two index search services are the same. How they search for content with the use of spiders or robots and how their listings are compiled in their database can be vastly different. Some services consider words in a Web site's "title" and "description" and "keyword" meta tags of primary relevance in finding a match. Other search services may disregard meta tags and focus on the content of information in the Web site itself. Generally, they will grab a page or two of text and rank the content based on the occurrence of specific words that appear in the content. For example, a Web page which mentions "koa wood" multiple times may be indexed or ranked high for relevancy in a search for "koa wood".

A relevancy ranking may be quantified by some services in terms of percentages, with listings rated with higher percentages listed higher in a search report than those assigned lower percentages. This provides the user with a scale of relative measurement. However, it can result in a Web site assigned a low ranking receiving little or no visits. Index search services can also access listings from multiple databases in cooperation with it and combine the results together in a single search report as if from a single large database. An example of a system for combining the search results of multiple databases is described in U.S. Pat. No. 5,659,732 in the name of S. T. Kirsch, assigned to Infoseek Corporation, Santa Clara, Calif.

Some search services also take into consideration the number of other links pointing at a particular site in determining its importance. Two Web sites with generally the same frequency of the words "koa wood" might be ranked differently by some search services based on the number of other Web sites which make reference to the site's URL address. Such services assume that if a site has several referral links pointing to it, it probably contains relevant information and is of higher value. An example of a system for ranking site listings by how often it is referenced by other sites is described in U.S. Pat. No. 5,748,954 in the name of M. L. Maudlin, assigned to Carnegie Mellon University, Pittsburgh, Pa.

Other factors used to consider a Web site's ranking include verification of matches between the keyword meta tag data and the actual content in a Web site's document. If there is no clear association between the hidden keyword meta tag data and the content data, a site might be marked irrelevant and ranked low in a search. Another negative factor might be the overuse of certain keywords in a Web site. Repeating "koa wood" multiple times in either the keyword meta tag or in the document itself can be considered "spamming", i.e., the repeated use of words in a frequency that the spider or robot identifies as overly repetitive. If a robot or spider detects blatant "spamming", the search service may penalize the Web site by giving it a lower relevance value in search results or even remove the Web site from its database. For Web site designers and publishers, it is critical to present site content in a manner that would increase the likelihood that it will receive a high ranking in a search, while at the same time avoid the kind of over-manipulation of content that may be rejected.

In contrast to index search services, category or directory search services group Web site content into specific categories, like an encyclopedia. Instead of typing in keywords to locate specific information, the user selects a category of interest from a list. Finer-grained levels of subcategories in a hierarchy may be assigned in order to break down the listings in large categories into more manageable lists for the user. The definitions of categories and subcategories are chosen by each search service and is to a large extent arbitrary. The category search service collects information on Web site listings supplied by human editors, which is reviewed and placed into the appropriate categories. This is a time consuming task considering that there are often thousands of new Web site entries per day handled by major search services. The heavy volume of Web site listings has caused most category search services to take weeks, months and even years to list a robust enough set of available Web site entries.

When a Web site is placed in a category, it is usually sorted with the other listings in alphabetical order. This can be an advantage or a disadvantage, depending upon a Web site's alphabetical title position. Because category services rely on human entry of Web site listings, there is usually no automatic review of a Web sites for current status or relevance, and many sites can become defunct or not be updated for years. Some category services have recently combined the category method with a ranking system to assign a highlighted mark, higher position or relevancy measure to Web sites deemed to be of higher value. A Web site having a title late in the alphabet and without a highlighted status will be relegated to a lower portion of the list and will be less attractive and more difficult to locate than others. Having the search service determine what should be highlighted can lead to arbitrary rankings and takes the success of a Web site's to visitors out of their own hands.

Currently, most major search services combine some form of both the index and the category methods to meet user preferences. This allows each type of service to keep or attract new users who might otherwise prefer a different service for a more targeted search function. As a result, users generally find that the benefits and disadvantages of both types of services to be about the same. For the subscriber, each type of service entails some degree of arbitrariness, either in the factors selected to compute a relevancy ranking or in the subjective determination of a site's relevancy.

How high or prominently a Web site is ranked by a search service is directly related to the frequency of visits or "hits" it receives from a search. Generally, the more hits a site has, the more potential inquiries or transactions will occur. In order to achieve positive search results with well over 100 million publicly available Web pages currently, Web site developers need to pay constant attention to the content as well as to the structure and frequency of their Web site submissions. It is not uncommon for Web sites to spend hundreds of dollars to promote their site to search services. Thus, the Internet searching and indexing industry at present is characterized by high opportunity and maintenance costs for results that are arbitrary or uncertain for the subscriber. These conditions may become increasingly unacceptable as the volume or Web sites, number of subscribers, level of commerce, and the costs involved continue to increase.

SUMMARY OF THE INVENTION

It is therefore a principal object of the present invention to devise a method and system for Internet searching and indexing in which Web site owners can determine for themselves the rankings that their information or services should receive in competition with others, and not through computation of a ranking based on arbitrary factors or subjective determination by a search service. It is a further object that the Web site owners be able to readily upgrade or downgrade their rankings based upon their assessment of market factors on an on-going basis. It is also desirable that this system be readily implemented at manageable cost and readily understood by users without having to accept a new search orthodoxy or unfamiliar change of search usage.

In accordance with the present invention, a method and system of network site searching and listing comprises a listing server connected to a network accessible by a plurality of users, having a site listings database containing a plurality of site listings, each of which is provided by a site listing subscriber and includes a title or description of the content of the respective site, a network address at which the site can be accessed on the network, and a denominated value to be paid by the subscriber associated with the site listing while it is maintained on the listing server, wherein said listing server provides a search report of listings relevant to a search inquiry from a user in which the listings are ranked in order according to the denominated values associated with the listings.

In the preferred embodiment, subscribers pay a monetary amount of their own choosing as a subscription fee to list a site with the listing service for a defined subscription period. The higher the amount paid for a given subscription period in relation to other listers, the higher the site's ranking on the service's search reports. Subscribers can monitor the ranking of their listings in relation to others, and can modify their rankings by raising or lowering their subscription fees, through a subscription monitoring interface provided with the listing server. Changes to the subscription fees, and consequently to the rankings, may be handled by the listing service at defined adjustment intervals, such as daily, weekly, monthly, etc. The denominated value may be based upon a monetary value, or even a credit or point system, depending upon the type of subscriber base being solicited by the listing service.

The denominated-value approach to rankings may also be used in conjunction with the index search method or the category search method. In the first case, an index search of the listing service's database is performed using keywords, and the resulting listings found are ranked according to their subscription fee values. In the second case, the subscribers' listings are assigned to appropriate categories, then when the user inputs a selection of categories of interest, the resulting listings found are ranked according to their subscription fee values.

The denominated-value listing server's database may also be linked to other search services, and the denominated-values or rankings of the listings can be converted into percentages or other relevancy rankings used by the other search services simply by computing a numerical equivalent of the denominated-value ranking, or a ratio of the subscription fee paid for a listing in relation to a benchmark value for all related listings, such as a highest fee paid, a normalized average of fees paid, a weighted composite of fees paid, etc.

The present invention allows an individual to create a listings management account through the listing service's monitoring interface, called URL POSITION MANAGER™, for one or more Web site submissions. The subscriber enters detailed information for each Web site submission in each appropriate category. While the subscriber pays for or renews their subscription service on a periodic basis, the account management interface allows the subscriber to constantly monitor, update, and/or reposition their listing, depending upon the economic factors that justify their advertisement costs for the Web site.

The subscriber for a Web site thus has the opportunity to determine in competitive monetary terms where their site appears in the search results. This eliminates the use of arbitrary factors to compute a relevancy ranking, or a subjective determination of value by the search service, and instead allows the subscriber direct control over their site listing. Generally, the more substantial and popular the Web site, the larger the interest in having positive search listing results. The freedom to make spontaneous modifications to their search rankings provides the subscriber with a more rational and responsive search service than exists currently.

DESCRIPTION OF THE DRAWINGS

FIG. 4B is a diagram of the results of the denominated-value search service following a category search query.

DETAILED DESCRIPTION OF THE INVENTION

Figure 5:
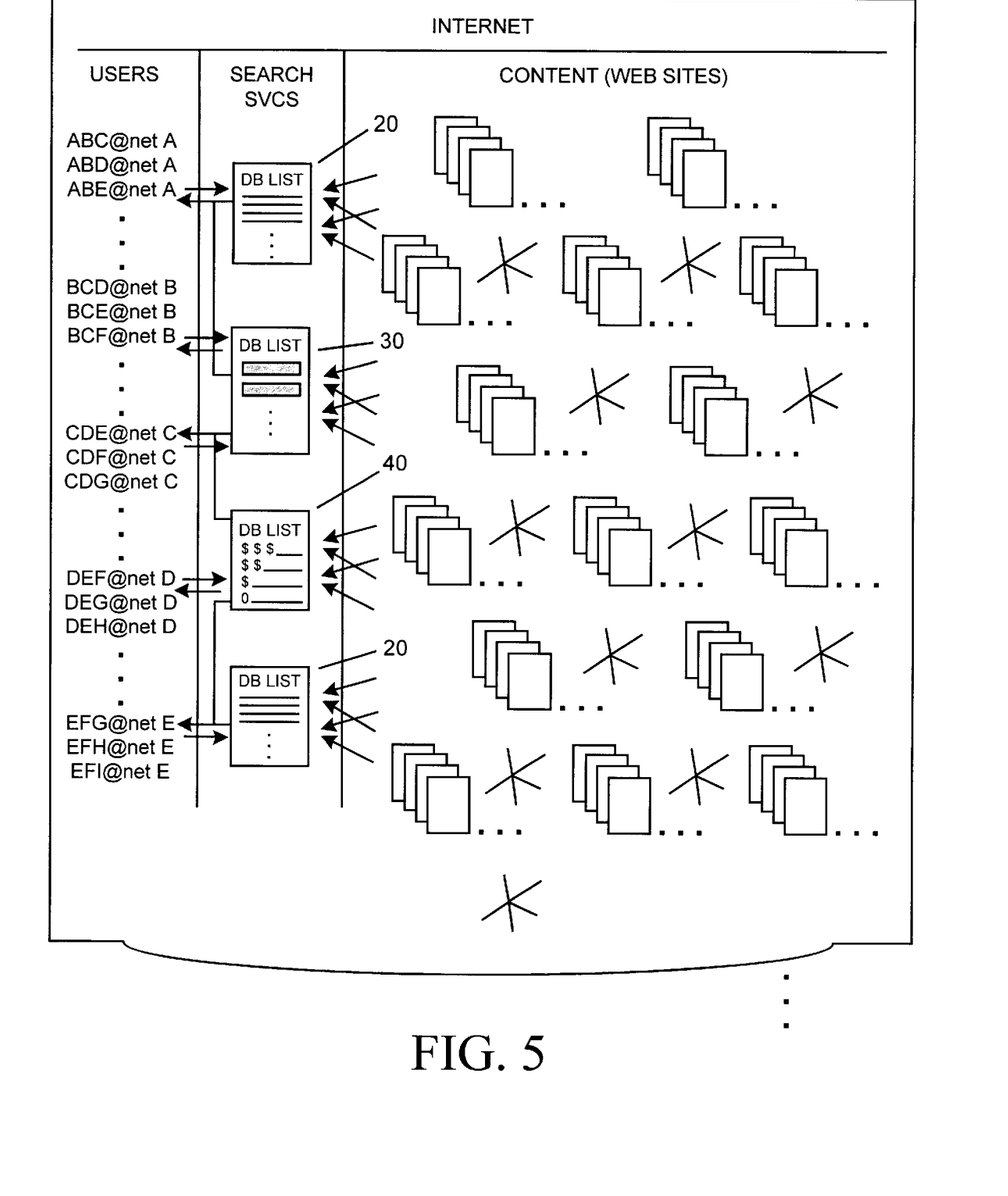
FIG. 5 is a diagram of the denominated-value search service of the present invention in relation to conventional search services in the Internet environment.

Referring first to FIG. 5, the Internet is depicted as an infinite universe populated by users and information content connected by computers, networks, servers, and data lines. Information content can reside as a file or host of files anywhere on any computer. Users are connected by the Internet, often referred to as "the network of networks", for access to information content. The system for addressing content on the Internet employs Universal Resource Locators (URLs), which are numerical addresses for information content sites on computers on the Internet. The totality of URL-addressable space is often referred to as the World Wide Web, or "the Web" colloquially.

To keep track of the plethora of information content sites, search services assemble databases of descriptive listings for the sites. As previously mentioned, the two general types of search methodologies that have evolved are the index search, which automatedly searches out content on the Web and indexes them according to certain targeted keywords and other factors, and the category search, in which site listing submissions are reviewed and assigned to selected categories. By entering one or more keywords with or without Boolean operators, a user ABE@netA can query an index search service (indicated by the numeral 20 in the figure), and receives targeted listings in a search report. The search report may rate the listings by a relevancy ranking, computed on the basis of certain relevancy factors selected by the search service. Alternatively, a user BCF@netB can query a category search service (indicated by the numeral 30 in the figure) by categories, and receive listings of sites assigned to those categories. The index and category methods may be combined, as indicated by the bar in the figure.

In the present invention, a denominated-value search service (indicated by the numeral 40 in the figure) provides a search report in response to user query in which the listings are ranked by value ($) as paid by the listing subscriber. The denominated-value ranking may be preceded by an index search 20 and/or a category search 30 to locate a subset of targeted or categorized listings. The index or category search is performed on the denominated-value service's database of listings. Each listing includes a title or description of the content of the respective site, a network address at which the site can be accessed on the network, and a denominated value to be paid by the subscriber associated with the site listing while it is maintained on the listing server. As described further below, the denominated-value search report may also be provided to other search services and converted to their rating systems for inclusion in their search reports.

Figure 1A:
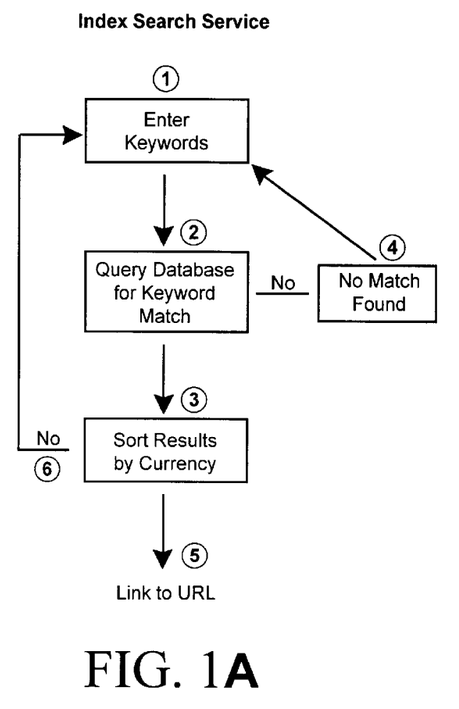
FIG. 1A is a diagram of the methodology of a conventional index search service.
Figure 4A:
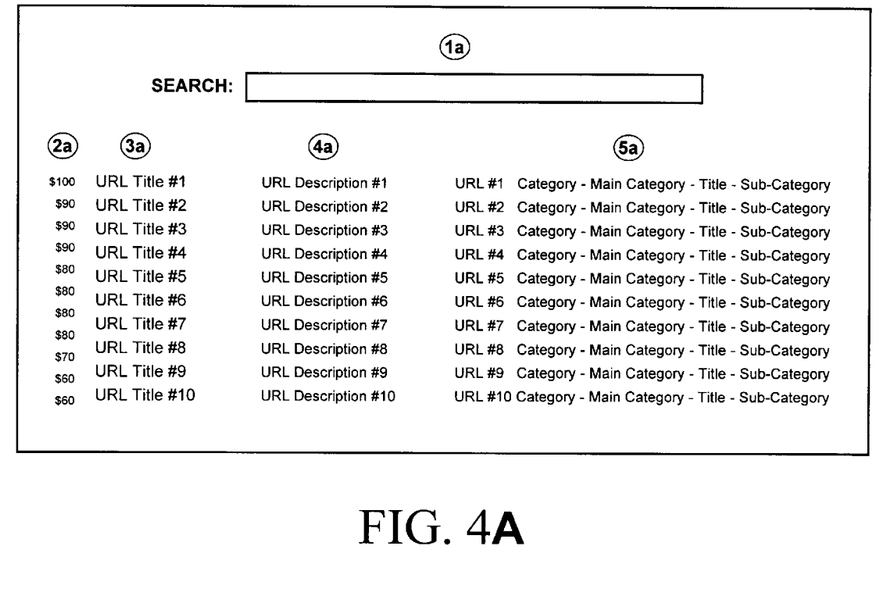
FIG. 4A is a diagram of the results of the denominated-value search service following an index search query.

There are two primary levels of function handled by the denominated-value search service in accordance with the invention: the retrieval of information for users, and the management of Web site listings for subscribers. For the retrieval of information, the service can offer index and category search options. With reference to FIG. 1A, the index type of search begins with the entry of keywords in block 1. The keywords are searched in the database with the results either being positive in block 2 or negative in block 4. Positive results are sorted and displayed by denominated value (dollar amounts paid for subscription fees) in block 3. The results are displayed, as shown in FIG. 4A, with a display 1a of the keyword or Boolean search syntax, the denominated values 2a ordered from highest to lowest, the Web site titles 3a (which are also the hyperlinks to the sites), the site descriptions 4a, and the URLs and category locations 5a. Negative query results transfer back from block 4 to block 1. If the user selects a site listed in 3a, the user is transferred to the web site location as indicated at block 5. If there are no URLs of interest, the user is transferred from block 6 to block 1.

Figure 1B:
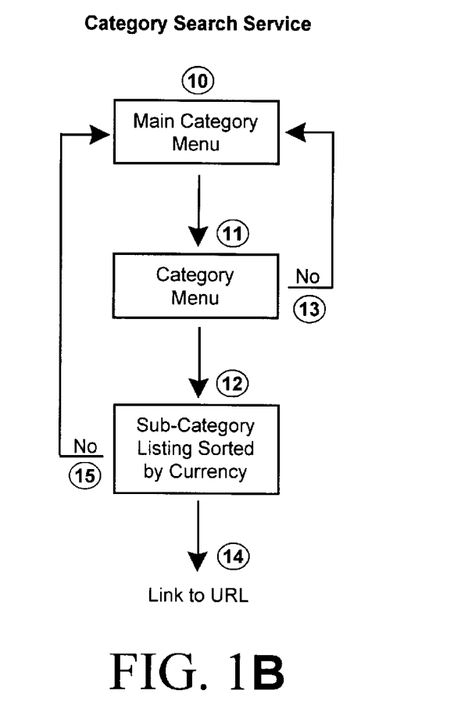
FIG. 1B is a diagram of the methodology of a conventional category search service.

Referring to FIG, 1B, the retrieval by category search begins with a main category menu indicated at block 10, and user input to select a category from the menu at block 11. Input to a subcategory menu is indicated at block 12, resulting in the subcategory list of listings being displayed. As shown in FIG. 4B, the display includes the category title 11a, subcategories 12a, further subcategories 13a–13f, denominated values 14a ordered from highest to lowest, Web site titles 15a (as hyperlinks), and site descriptions 16a. If no category selection was made at block 11, then the user returns to block 10 via branch 13. If no sub-category selection was made at block 12, then the user returns to block 10 via branch 15. If the user selects a listed site in block 12, then the user is transferred to the Web site location via link 14.

Figure 2A:
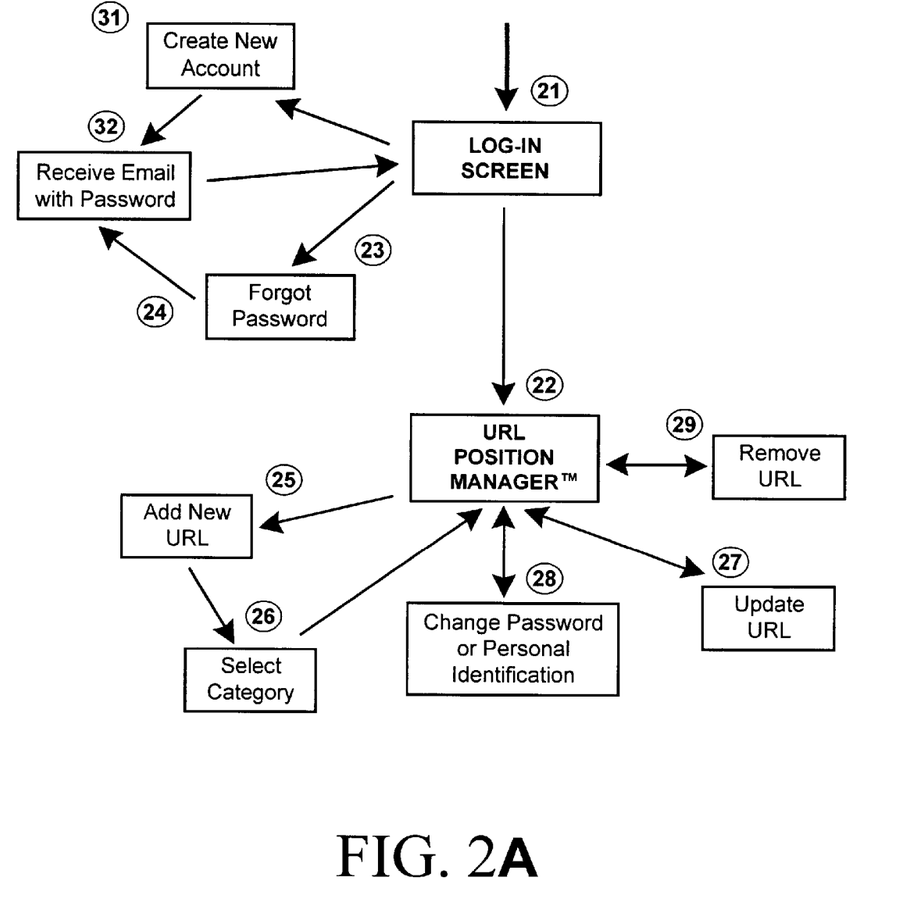
FIG. 2A is a diagram of functions performed for listings account management in the denominated-value search service of the present invention.

Referring to FIG. 2A, the second level of listings management functions for the subscriber is depicted in a preferred example. Entry to this function level requires an input and and password to log-in at log-in screen 21. If the subscriber is new and has not created an account, they will be transferred to the Create New Account procedure at block 10. After completing the necessary information they will be sent an email in block 11, containing their password to log-in at block 1. If the subscriber does not remember their password in block 3, they will be transferred to block 31 where an email message and password will be sent, to allow return to the log-in at block 21. Once the correct ID and password have been entered, the subscriber is transferred to the listings management program, referred to as "URL POSITION MANAGERS™" at block 22. From here they have access to the Remove URL command at block 29, Change Password or Personal Identification at block 28, Update URL information at block 27, and Add New URL at block 25. All of these routines are updated automatically through the URL POSITION MANAGER™.

Figure 2B:
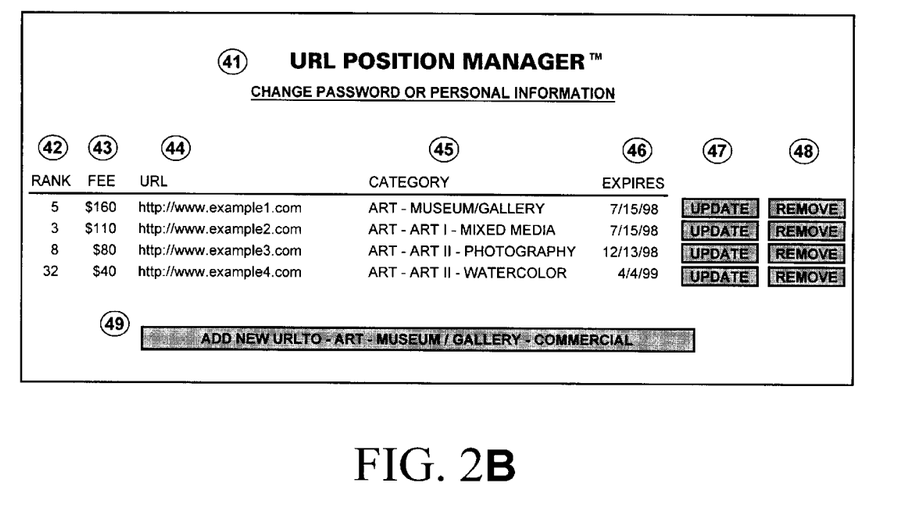
FIG. 2B shows a listings update interface.
Figure 3:
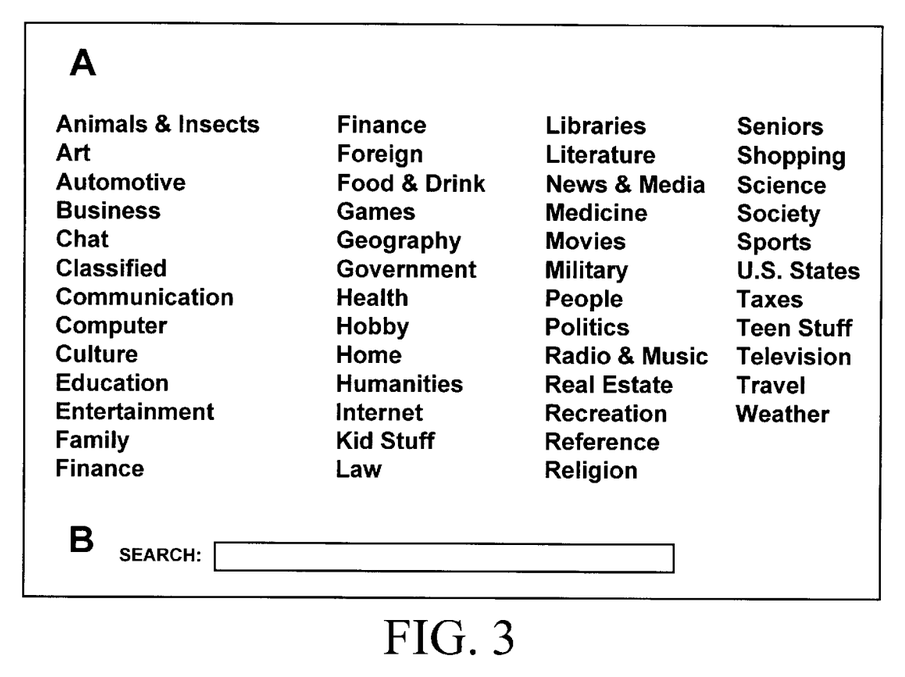
FIG. 3 illustrates an user interface for conventional index and category searches, as used with the denominated-value search service of the present invention.

Referring to FIG. 2B, an interface to the URL POSITION MANAGER™ is shown displaying a link 41 to change the password or personal information of the subscriber account holder, then a listing of all sites maintained in the account, referenced by the current rank 42 within the particular category/subcategory, the denominated values (fees paid) 43 for the listings, the URL addresses 44 for the sites, the category locations 45, the expiration dates 46 for the site listings, listings update buttons 47, listings removal buttons 48, and an Add New URL button 49. The Add New URL feature offers the user the ability to enter a new listing and select the main category and subcategory deemed most appropriate. Once the user completes the necessary information, they are returned to the URL POSITION MANAGER™ menu at block 22.

With the use of the URL POSITION MANAGER™ interface, a URL may be automatically added to the Internet search service database. By logging in with the correct identification, a subscriber may add one or more URLs to the database, update the subscriber's account including any of the listed URL addresses, titles, descriptions, keywords, IDs, and subscription fees. The subscriber can use the REMOVE link to remove a URL, the UPDATE link to change their URL information, and the MODIFY USER ACCOUNT link to change their password, email address and personal information. A subscriber may also control the URLs active or inactive listing status, in case the URL is under construction and needs to hide its visibility until completion.

If a new subscriber logs on, the system checks their status as New Members, and allows the new subscriber to enter their personal information in order to establish a new account. A password is assigned and automatically sent by e-mail to the suscriber's address. Thus, the New Member can be promptly cleared to commence new listings transactions.

When a subscriber is ready to make payment of the amount or increment to the subscription fee, the system can automatically execute a credit card payment transaction. Once payment is validated, the system will automatically update the database and begin listing the URLs in the appropriate categories and rankings in response to new search queries. Because the positions of the listings are based on objective criteria, i.e., the denominated value paid by the subscriber, the subscriber can pay an increment to improve a listing's position relative to other URLs within the service, and have the new position immediately reflected in the search database. This eliminates the long delays and arbitrary results offered by conventional search services which must evaluate content or classification before adding or updating a listing.

Given the above description of an overall approach to the denominated-value search service of the present invention, specific examples of different types of service configurations and feature variations will now be described.

EXAMPLE I

In this example, each new web site being added to the system is entered with required information such as email address, password, personal and web site data. The subscriber will enter their email address and a password to control access to the URL POSITION MANAGER™ database. The subscriber selects the appropriate categories for each web site they wish to add. They can enter as many web sites as they choose. The service reserves the option to verify that the category preference indicated matches the general content of the site. The subscriber can select any subscription fee they choose, which is good for a one year subscription period. The subscription fee may be zero to any amount in U.S. $10 increments. At prescribed adjustment periods, such as weekly, the subscriber may log on to the listings management program, and adjust the subscription fee upward if maintenance of a desired position against competitors or a higher position is desired. The original expiration date of one year remains regardless of any change to subscription fees. At the end of the original expiration date, the user has the option of renewing the subscription at the current fee or any other fee desired. All subscription fees are paid in advance and no refunds are given.

The web site listings in index or category search results are displayed in fee order from highest to lowest. Listings at the same fee level are displayed on a first come, first served basis. Free web site submissions will be reviewed prior to database placement. Fee-based submissions will be added to the database immediately and reviewed at a later date. This will allow tthe subscriber to obtain an immediate Web site placement for as little as $10. If the indicated category is incorrect, the listing will be moved to a more appropriate category or removed from the database.

In effect, this exemplary type of service allows a subscriber to chose the rank of their listing by selecting an appropriate initial fee followed by any necessary adjustments to maintain or increase its ranking. The transaction can be completed in a few minutes on-line with a credit card payment or other credit given, thus avoiding high transaction costs and delays for content review. Following the close of the time for adjustment, the rankings are locked in for the duration of the adjustment period, but may thereafter be further adjusted. The amount paid is based purely on economic considerations, and not arbitrary factors. There is no alphabetical ordering that places titles late in the alphabet at an arbitrary disadvantage. Also, search services can reduce their liability to subscriber disappointment since rational monetary factors rather than arbitrary factors are used in determining a listing's rank.

EXAMPLE II

In this example, the denominated-value search and listing service lists URLs on a credit point system. Credit points may be purchased at stated dollar values, e.g., 10 points per $1, and/or awarded as described further herein. A listing may be added to the database for free, but the subscriber must use credit points to increase the listing's rank. Search results are displayed ranked in order of the total of credit points allotted to the listing. The listing may be valid for a predetermined subscription period. Alternatively, the listing may have no expiration date in the circumstance where the credit point totals are allowed to cumulate to higher and higher totals over time.

Figure 6:
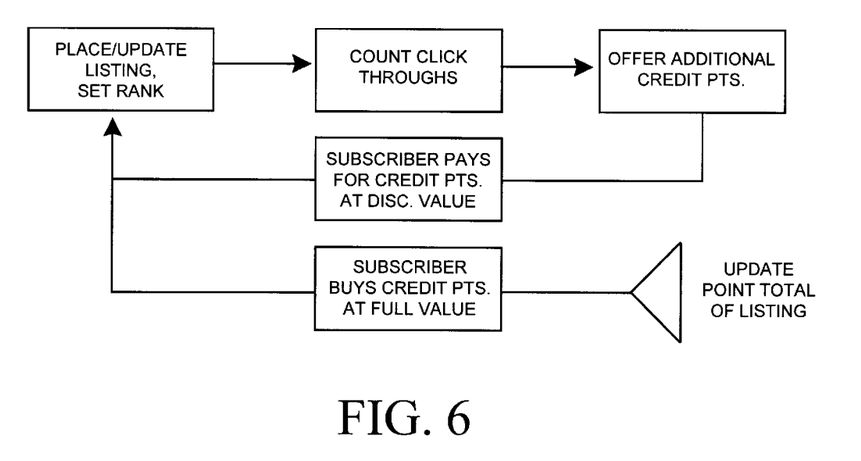
FIG. 6 is a diagram illustrating a denominated-value search service of the present invention which uses a credit point total to set the rankings of search listings.

Referring to FIG. 6, the value methodology of another version of the denominated-value listing service is illustrated. The service can award a credit point each time a user clicks on a listing reported in a search in order to link to the listed Web site. At periodic intervals, the system tallies up the total number of "click throughs" in the current period, and notifies the subscriber by e-mail offering to add the credit points to their total for the listing and to bill the subscriber's account a discounted amount for the credit points, e.g., 20 points per $1. The discounted purchase price rewards the subscriber for having a listing deemed to be of value to users, and provides an advantage over a subscriber who adds to the credit point total by purchasing the credit points.

The subscriber is then given a period of time to accept or reject the additional points. If the subscriber accepts and makes payment or has an established credit agreement with the service, the additional credit points are added to the listing's total, and the rank of the listing may be improved immediately to reflect the additional points. Improved ranking is likely to lead to more click throughs, so that the subscriber can gradually improve the value of the listing commensurate with the actual response level of users to the listing. If the subscriber declines, then the point total for the listing stays the same. Over time, the ranking of a listing which the subscriber does not add to the point total will decrease relative to other listings.

EXAMPLE III

The denominated-value search database can be linked to other search databases using different site relevancy measures. If a query is forwarded from another search service, the denominated-value service can conduct its usual index/category search followed by denominated-value ordering. The denominated-value rankings can then be converted into a relevancy measure consistent with the requesting search service. For example, if the requesting search service uses a percentage relevancy measure, the denominated-value ranking can be converted to a percentage equivalent according to the position of its rank, or by computing the ratio of the fee paid for a listing in relation to a benchmark value for all related listings. The benchmark value can be the highest fee paid for a listing in that search result, or by a Bell-curve percentage for the normalized average of fees paid, or by a weighted composite of fees paid, etc.

The cross-database communication of queries and search results can be handled by a standard protocol for directory queries, such as the Lightweight Directory Access Protocol (LDAP) developed at the University of Michigan. The LDAP protocol is being supported by a wide range of public and private groups as a proposed open standard for accessing on-line directory services over the TCP/IP network protocol. Techniques also exist for combining search reports queried from multiple databases in a single search report, as described for example in U.S. Pat. No. 5,659,732 in the name of S. T. Kirsch, assigned to Infoseek Corporation, Santa Clara, Calif. The linking to other search services allows the denominated-value database to be accessed by a much wider base of users of the other search services, and at the same time return results consistent with the requesting service's relevancy measure and accurately reflecting the relevancy measure of the denominated-value database.

It is understood that many modifications and variations may be devised given the above description of the principles of the invention. It is intended that all such modifications and variations be considered as within the spirit and scope of this invention, as it is defined in the following claims.

What is claimed is:

1. A system of network site searching and listing comprising:

a listing server connected to a network accessible by a plurality of users, having a site listings database containing a plurality of site listings, each of which is provided by a site listing subscriber and includes a title or description of the content of the respective site, a network address at which the site can be accessed on the network, and a denominated value bid by the subscriber for the site listing while it is maintained on the listing server, server search program means for searching the site listings database for site listings having titles or descriptions of content that match a given search inquiry from a user and for ordering the site listings found in the search in order of their denominated values, wherein said listing server provides a search report of the denominated-value-ordered site listings relevant to the search inquiry to the user in order according to the denominated values bid by the subscribers for the found site listings, and bid management program means including a subscriber account interface for allowing a subscriber to connect online with the listing server and to automatically enter a new denominated value bid for said subscriber's site listing into the site listings database, wherein said server search program means of said listing server thereupon conducts searches of the site listings database for site listings in response to search inquiries from users by automatically taking into account the new denominated value bid entered by the subscriber for the subscriber's site listing.

2. A system according to claim 1, wherein the denominated value to be paid by the subscriber is a subscription fee of an initially entered amount which may be adjusted during a defined adjustment period.

3. A system according to claim 1, wherein said listing server includes an account interface to the network accessible to subscribers having means for allowing a subscriber to enter information to set the subscription fee for a respective listing in order to obtain a desired rank for the listing.

4. A system according to claim 3, wherein said interface includes means for allowing the subscriber to maintain a plurality of site listings in a listings account accessible through said account interface.

5. A system according to claim 1, wherein said listing server includes search means for conducting a search of its site listings database according to search parameters provided with the search inquiry from a user.

6. A system according to claim 5, wherein said search means conducts an index search of the site listings database based upon keywords provided with the search inquiry from a user.

7. A system according to claim 5, wherein said search means conducts a category search of the site listings database based upon a selected category provided with the search inquiry from a user.

8. A system according to claim 5, wherein said listing server is linked to respond to search inquiries from other search servers, and includes relevancy measure conversion means for converting its search report of listings by rank according to denominated values into other relevancy measures used by the other search services.

9. A system according to claim 8, wherein the relevancy measure used by another server is a relevancy percentage, and said relevancy measure conversion means converts the search report's ranks listings based on denominated values into relevancy percentages.

10. A system according to claim 1, wherein the denominated value is a credit point amount applied by the subscriber to the respective listing.

11. A system according to claim 10, wherein credit points applied by the subscriber to the respective listing are obtained in accordance with a number of click-throughs for the listing obtained in searches of the listings database.

12. A system according to claim 1, wherein said subscriber account interface allows a subscriber to search and view the subscriber's previously entered site listing ranked in comparison to the denominated values of other site listings entered by other subscribers, and to enter a new denominated value bid in order to chance the ranking of said subscriber's site listing relative to those of the other subscribers.

13. A system of network site searching and listing comprising:

a listing server connected to a network accessible by a plurality of users, having a site listings database containing a plurality of site listings, each of which is provided by a site listing subscriber and includes a title or description of the content of the respective site, a network address at which the site can be accessed on the network, and a denominated value bid by the subscriber for the site listing while it is maintained on the listing server, server search means for searching the site listings database for site listings having titles or descriptions of content that match a given search inquiry from a user and for ordering the site listings found in the search in order of their denominated values, wherein said listing server provides a search report of the denominated-value-ordered site listings relevant to a search inquiry to a user in which the listings are in order according to the denominated values bid by the subscribers for the listings, and bid management means including a subscriber account interface for allowing a subscriber to connect online with the listing server and to automatically enter a new denominated value bid for said subscriber's site listing into the site listings database.

14. A system according to claim 13, wherein said account interface has update means for automatically updating the listings database with subscription fee information entered by subscribers, so that searches of said listings database reflect rankings for the listings in accordance with the updated subscription fee information.

15. A system according to claim 13, wherein said account means has payment processing means for automatically executing payment transactions in accordance with subscription fee information entered by subscribers.

16. A system according to claim 13, wherein said subscriber account interface allows a subscriber to search and view the subscriber's previously entered site listing ranked in comparison to the denominated values of other site listings entered by other subscribers, and to enter a new denominated value bid in order to change the ranking of said subscriber's site listing relative to those of the other subscribers.

17. A method of network site searching and listing comprising:

providing network site listings to be maintained in a a site listings database of a listing server connected to a network accessible by a plurality of users, each site listing being provided by a site listing subscriber and having a title or description of the content of the respective site, a network address at which the site can be accessed on the network, and a denominated value bid by the subscriber for the site listing, and searching the site listings database for site listings having titles or descriptions of content that match a given search inquiry from a user and ordering the site listings found in the search in order of their denominated values, and allowing a subscriber to connect online with the listing server and to automatically enter a new denominated value bid for said subscriber's site listing into the site listings database.

18. A method according to claim 17, wherein the denominated value to be paid by the subscriber is a subscription fee of an initially entered amount which may be adjusted during a defined adjustment period.

19. A method according to claim 17, further comprising the step of accessing said listing server by subscribers through the network in order to enter information to set the subscription fee for a respective listing.

20. A method according to claim 17, wherein the denominated value is a credit point amount applied by the subscriber to the respective listing.

21. A method according to claim 17, further comprising the step of linking the listing server to respond to search inquiries from other search servers, and converting its search report of listings by rank according to denominated values into other relevancy measures used by the other search services.

22. A method according to claim 21, wherein the relevancy measure used by another server is a relevancy percentage, and said search report's ranks of listings based on denominated values are converted into relevancy percentages.

23. A method according to claim 17, wherein said step of allowing a subscriber to connect online includes the substep of allowing the subscriber to search and view the subscriber's previously entered site listing ranked in comparison to the denominated values of other site listings entered by other subscribers, and to enter a new denominated value bid in order to change the ranking of said subscriber's site listing relative to those of the other subscribers.

\* \* \* \* \*